Patented June 23, 1942

2,287,022

UNITED STATES PATENT OFFICE 2,287,022

CATALYST

Robert E. Burk and Everett C. Hughes, Cleveland Heights, Ohio, assignors to The Standard Oil Company, Cleveland, Ohio, a corporation of Ohio No Drawing. Application March 28, 1939, Serial No. 264,594

4 Claims. (Cl. 252—210)

In the production of catalysts by reaction, we have found that the customary products are characterized by considerable non-uniformity. Conventionally also, there is quite a variation from batch to batch. This occasions peculiar premature deterioration of catalyst action and difficulty in satisfactory regeneration. Particularly, where one of the initial components for a catalyst must be introduced in solid or undissolved form, the difficulties from non-uniformity are very greatly enhanced. In accordance with the present invention however, it becomes possible to control the formation of the catalysts such as to attain a highly uniform output and to attain novel catalysts and catalytic operations therewith.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The materials to be made up into the catalyst, are, in accordance with the invention, brought into reaction in a progressive manner, instead of the usual simultaneous supplying of the components, and in particular one of the components, preferably the precipitating component is fed progressively such that in the reaction zone there is a deficiency of such component available, until the reaction is ready to be finally completed, whereupon the requisite amount for the deficiency is brought up. And, further, in progressively providing the component of a precipitating character, we apply an advantageous control by first feeding the component in gaseous form to a desired point in the reaction, and then completing the deficiency by adding in solution form. This manner of making up catalysts is notably advantageous where one component is initially solid. For instance, in using dried alumina, we may mix it and the solution of a metal salt of appropriate character, and start the reaction by passing in a gaseous feed of a precipitating component, such as ammonia gas, the feed being maintained at a rate of progressive supply to the reaction zone while maintaining a deficiency of the precipitant up to a predetermined stage short of completion. Then, the precipitant in solution form, as for instance ammonium hydroxide, is added to completion of the reaction. And care is taken to prevent access of air. Having thus carried out the precipitation by progressive stages and having brought it to final completion, and having thoroughly mixed and agitated the material in the reaction zone, the water and excess of ammonia and the like are eliminated by heating to a sufficiently high temperature, best under a vacuum, and the catalyst may be granulated or made up in pellet form for use in contact catalysis operations. Catalysts for aromatizing or dehydrogenating hydrocarbons are thus capable of being prepared with excellent activity and uniformity and satisfactoriness of capacity for regeneration.

As an example: 25 parts by weight of manganous acetate are dissolved in 50 parts of water, and to 50 parts of previously dried alumina the manganese acetate solution is added in a reaction zone. Ammonia gas is passed into the material for about 15 minutes, and then 20 parts of concentrated ammonium hydroxide are added in such manner that no air enters the solution. Thorough agitation is provided. After completion of the reaction, water, and ammonium acetate are removed by heating at a temperature of about 850° F., under high vacuum, for about 4 hours.

Other components and proportions may be employed in this procedure of making catalysts, but where manganese and aluminum oxide are involved the aluminum oxide is in general predominant in amount. The catalyst, granulated or pelleted, is placed in a reaction zone having adequate heating means such that the temperature of the mass may be maintained for instance at 700–1250° F., and preferably about 932° F., and raw materials to be catalyzed, such as n-hexane, heptane, octane, etc., naphthas or distillates from petroleum of non-benzenoid character, e. g. Pennsylvania or Michigan naphthas, and desirably in boiling range 140–420° F., are brought into contact with the catalyst at a rate of feed depending upon the operating temperature, and which may be 0.1 to 10 liters of liquid per liter of catalyst. Pressure may be atmospheric up to 400 lbs. Conversion of the hydrocarbons to aromatics is thus advantageously had.

It is of particular advantage where the hydrocarbon material employed is a distillate or naphtha which may contain rather high boiling constituents, to fractionate the naphtha into lighter and heavier portions, and subject both to the action of the catalyst at elevated temperature, as indicated, and then condense the products and subject the products of the heavier portion to cracking, thermally or catalytically.

It is usually desirable to dilute the hydrocarbon as fed to the catalyst, and for this hydrogen may be used or the off-gas from the process. In some cases the hydrocarbon products obtained from the catalytic action may be subjected to a separation, as for instance by mixing with a selective solvent such as liquid sulphur dioxide or a high boiling amine or hydroxide, and the non-aromatics not dissolved by the solvent may be separated and be repassed into contact with the catalyst.

When the activity of the catalyst has declined to a predetermined point, the hydrocarbon feed may be shut off, and a feed of an oxygen-containing gas be substituted, and the temperature being maintained elevated the catalyst may be thereby regenerated for re-contact with the hydrocarbon. Carbon dioxide formed in regeneration may be re-cycled to the catalyst zone, and thereby supply heat, and a diluent action with the hydrocarbon feed may also thus be advantageously had, where desired.

Other modes of applying the principle of the invention may be employed, change being made as regards the details described, provided the features stated in any of the following claims, or the equivalent of such, be employed.

We therefore particularly point out and distinctly claim as our invention:

1. In a process of making a catalyst, agitating a solution containing a dissolved manganese salt and undissolved alumina in suspension, and introducing ammonia gas precipitant, and finally completing the precipitation with ammonium hydroxide, and settling both catalyst components together.

2. A catalyst prepared in accordance with the process of claim 1.

3. In a process of making a catalyst, agitating 50 parts by weight of dried alumina in suspension with a solution of 25 parts of manganese acetate in 50 parts of water and passing ammonia gas into such solution in amount insufficient for precipitation, then precipitating by adding about 20 parts of concentrated ammonium hydroxide without admitting air, and continuing the agitating, and finally heating the mixture at about 850° F. under vacuum for about 4 hours.

4. In a process of making a catalyst, agitating dried alumina in suspension with manganese acetate solution and passing ammonia gas into the solution in amount insufficient for precipitation, then precipitating by adding ammonia solution without admitting air, and continuing the agitating, and finally removing ammonia and water by heating the precipitated catalyst.

ROBERT E. BURK.
EVERETT C. HUGHES.